US006404475B1

(12) United States Patent
Nakayoshi et al.

(10) Patent No.: US 6,404,475 B1
(45) Date of Patent: Jun. 11, 2002

(54) LIQUID CRYSTAL DISPLAY DEVICE HAVING TWO REGIONS IN A PIXEL WITH STRUCTURAL DIFFERENCE IN INSULATING LAYER

(75) Inventors: Yoshiaki Nakayoshi; Kikuo Ono, both of Mobara; Junichi Hirakata, Chiba; Masahiro Ishii, Mobara; Masuyuki Ohta, Mobara; Nobuyuki Suzuki, Mobara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/372,148

(22) Filed: Aug. 11, 1999

(30) Foreign Application Priority Data

Aug. 12, 1998 (JP) .......................................... 10-228282

(51) Int. Cl.[7] .................... G02F 1/136; G02F 1/1333
(52) U.S. Cl. .................... 349/141; 349/43; 349/110; 349/138
(58) Field of Search ................. 349/141, 110, 349/43, 138; 365/149; 607/1

(56) References Cited

U.S. PATENT DOCUMENTS 5,148,392 A  *  9/1992  Masumoto ................. 365/149
5,956,111 A  *  9/1999  Ohta et al. ................. 349/141
6,064,460 A  *  5/2000  Ohta et al. ................. 349/141
6,122,031 A  *  9/2000  Terada et al. .............. 349/155
6,187,028 B1 *  2/2001  Munshi ......................... 607/1

\* cited by examiner

Primary Examiner—William L. Sikes
Assistant Examiner—Julie Ngo
(74) Attorney, Agent, or Firm—Antonelli, Terry, Stout & Kraus, LLP

(57) ABSTRACT

A liquid crystal display device suitable for generating an electric field sufficiently between the pixel electrode and the counter electrode to control the orientations of the liquid crystal molecules lying therebetween has a simple structure. A liquid crystal display device has a pair of substrates superposed on one another between which a liquid crystal layer is sealed, at least one video signal line and at least one pixel being formed on a surface of one of the pair of substrates confronting the liquid crystal layer. The pixel has at least one pixel electrode and at least two counter electrodes spaced from each other, and one of the counter electrodes is disposed adjacent to the one video signal line. The one video signal line and the one of the counter electrodes are spaced from one another by at least two insulating regions disposed along the surface, and one of the insulating regions comprises a material having a higher permittivity than that of the other regions.

14 Claims, 8 Drawing Sheets

LIQUID CRYSTAL DISPLAY DEVICE HAVING TWO REGIONS IN A PIXEL WITH STRUCTURAL DIFFERENCE IN INSULATING LAYER

BACKGROUND OF THE INVENTION

The present invention relates to liquid crystal display devices, and, more particularly, to liquid crystal display devices of the lateral electric field type.

A liquid crystal display device of the lateral electric field-driven type comprises a pair of transparent substrates disposed so as to be opposed to each other and to be spaced by a liquid crystal (LC) layer sealed therebetween, and a pixel electrode and a counter electrode are spaced apart from the pixel electrode formed in each of the pixel regions on a surface at the liquid crystal layer side of one of the pair of transparent substrates. A pixel electrode and a counter electrode disposed at each of the pixel regions generates an electric field therebetween so as to control the optical transmissivity of the liquid crystals in the vicinity of the pixel region. Since the liquid crystal display device of the lateral electric field type generates an electric field having a major component extending substantially parallel to a main surface of the transparent substrate between the pixel electrode and the counter electrode for switching the orientations of the liquid crystal molecules, the lateral electric field scheme is also referred to as the "In-Plane-Switching (IPS) scheme" also.

An active-matrix liquid crystal display device employing the lateral electric field scheme has a plurality of scan signal lines and a plurality of counter voltage signal lines both of which extend in an "x" direction (row direction), while being juxtaposed in parallel in a "y" (column) direction (transverse to the x direction), and a plurality of video signal lines which extend in the y direction, while being juxtaposed in the x direction on the surface at the liquid crystal layer side of the one of the pair of transparent substrates. When the scan signal lines, the counter voltage signal lines and the video signal lines are disposed on a surface of one of the pair of transparent substrates, each of the pixel regions is defined as an area surrounded by one of the scan signal lines, one of the counter voltage signal lines disposed adjacent to the scan signal line, and a pair of the image signal lines disposed adjacent to one another. Each of the pixel regions has a switching element, a pixel electrode, and a counter electrode. The switching element operates so as to be turned on by a scanning signal supplied by one of the scanning signal lines. The switching element, when turned on, supplies a video signal being transmitted by one of the video signal lines thereto to the pixel electrode in a pixel region corresponding thereto. A counter voltage for generating a potential difference between the counter electrode and the pixel electrode in the pixel region is transmitted through one of the counter voltage signal lines and is applied to the counter electrode.

A liquid crystal display device having the structure described above is characterized by the fact that it produces an image having a higher contrast ratio and exhibits a remarkably wider viewing angle.

The lateral electric field-type liquid crystal display device referred to above is described in detail in such documents as Japanese Patent Application Laid Open Hei 05-505247 (No. 505247/1993), Japanese Patent Publication Sho 63-021907 (No. 021907/1988), and Japanese Patent Application Laid Open Hei 06-160878 (No. 160878/1994).

The lateral electric field-type liquid crystal display device having the structural features described above utilizes electrodes (e.g. an pixel electrode and a counter electrode) formed of thin conductive films of several thousands Angstrom (Å) (thin film electrodes, hereinafter) and generates an electric field substantially in parallel with a surface of one of the pair of transparent substrates. However, it is difficult to reproduce the aforementioned electric field sufficiently and accurately in the liquid crystal layer lying between the thin film electrodes.

In addition to the aforementioned difficulty, the aforementioned electric field being generated between the pixel electrode and the counter electrode in a pixel corresponding thereto is affected by another electric field appearing from the video signal line adjacent to the pixel.

On the other hand, a black matrix layer (a light shielding film) is formed on a surface of another of the pair of transparent substrates confronting the one of the pair of transparent substrates on which the pixel electrode and the counter electrode are formed. For instance, the black matrix layer is formed on the surface of the substrate which confronts the liquid crystal layer. The black matrix layer may be formed of an insulating material or the like having such a high resistivity that the electric field between the pixel electrode and the counter electrode is generated to be as strong as possible.

The black matrix, being formed of an insulating material or the like, tends to have a higher optical transmissivity than that of metals so that a problem of deterioration of the contrast ratio occurs in an image displaying operation of the liquid crystal display device.

SUMMARY OF THE INVENTION

The present invention has been made in view of the technical background mentioned above, and an object of the present invention is to provide an improved liquid crystal display device which is suitable for generating an electric field sufficiently between the pixel electrode and the counter electrode as to control the orientations of the liquid crystal molecules lying therebetween in spite of utilizing a simple structure.

Another object of the present invention is to improve the contrast ratio of an image displayed by the liquid crystal display device.

Some representative aspects and features of the present invention as disclosed herein will be briefly summarized as follows.

The present invention provides a liquid crystal display device comprising: a pair of substrates being superposed on one another with a predetermined space therebetween in which a liquid crystal layer is sealed; at least one video signal line being formed on a surface of one of the pair of substrates confronting the liquid crystal layer; and at least one pixel being formed on the surface of the one of the pair of substrates and having at least one pixel electrode to which a signal is supplied through the at least one video signal line and at least two counter electrodes being spaced from the at least one pixel electrode, one of the at least two counter electrodes being disposed adjacent to the at least one video signal line. The display device is characterized in that: (1) the at least one video signal line and the one of the at least two counter electrodes are spaced from one another by at least two insulating regions disposed along the surface, and (2) one of the at least two insulating regions comprises a material having a higher permittivity than that of the other of the at least two insulating regions.

The present invention also provides another liquid crystal display device comprising: a pair of substrates being disposed opposite to one another a liquid crystal layer being sealed therebetween; at least one video signal line formed on a surface of one of the pair of substrates confronting the liquid crystal layer; and at least one pixel being formed on the surface of the one of the pair of substrates, being arranged adjacent to the at least one video signal line, and having at least one pixel electrode and at least one counter electrode, so as to apply an electric field to the liquid crystal layer therebetween. The display device is characterized in that: (1) at least a surface of the at least one video signal line is covered with an insulating material having a permittivity (a dielectric constant) higher than 6.7.

These and other objects, features and advantages of the present invention will become more apparent from the following description when taken in conjunction with the accompanying drawings.

DETAILED DESCRIPTION

Figure 1:
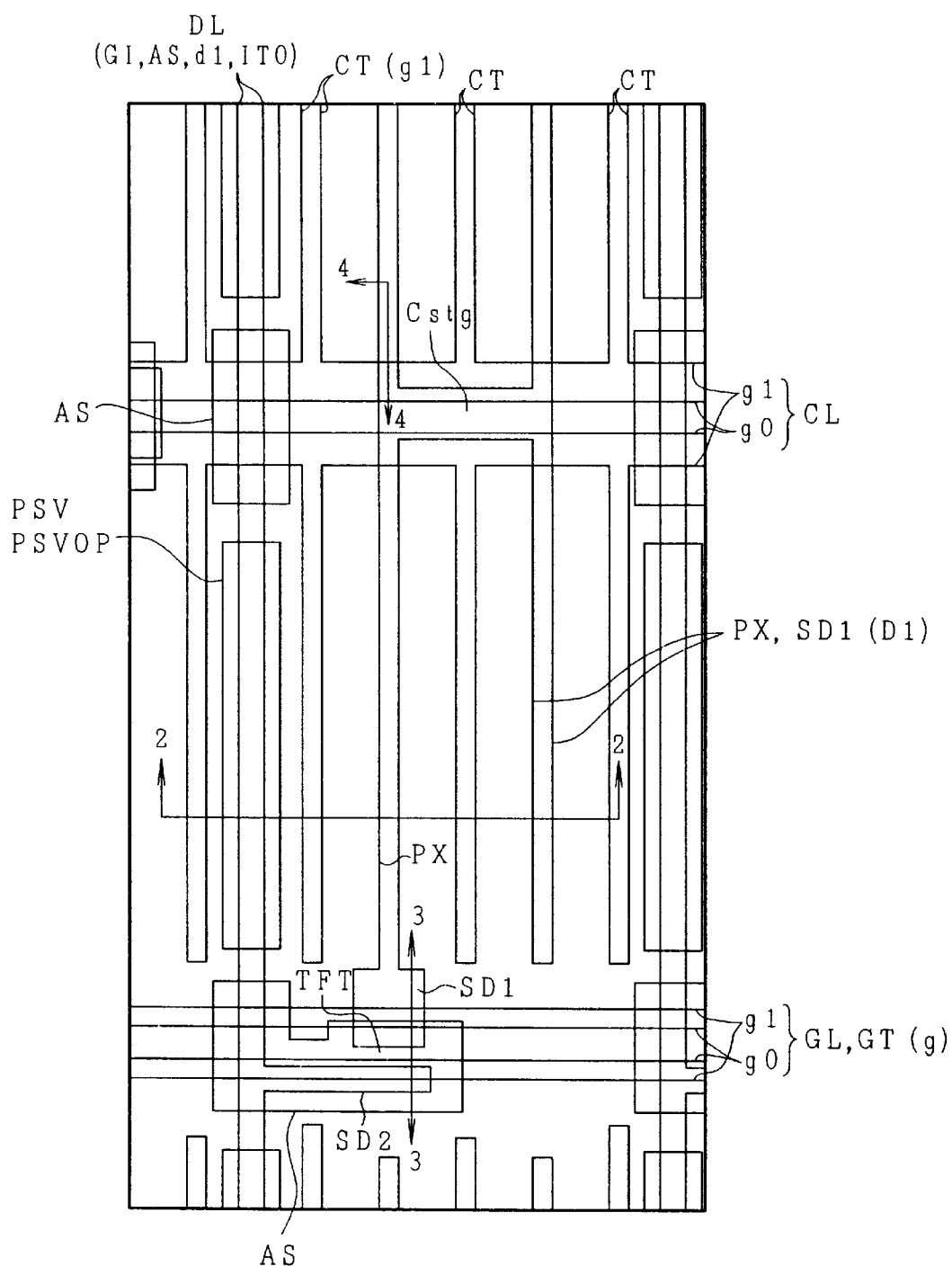
FIG. 1 is a plane view of a pixel region and its periphery in an active matrix type liquid crystal display device according to the present invention.

Other aspects and features of the present invention will be specified in the following descriptions with reference to the drawings.
<Active Matrix Type Liquid Crystal Display>

Preferred embodiments of the present invention as applied to a liquid crystal display device of the active matrix type will be explained hereinafter. In the drawings, elements having the same function are identified by the same reference designation, and repetitions of the explanations for such elements are omitted.
Embodiment 1
<Plane Structure of a Matrix (a Pixel Portion)>

FIG. 1 shows a plane view of a pixel region and its periphery in a color liquid crystal display device of the active matrix type according to the present invention.

As FIG. 1 shows, each of the pixels is arranged in an area enclosed by a scanning signal line (also called "gate signal line" or "horizontal signal line") GL, a counter voltage signal line (a wiring layer for a counter electrode, to be described later) CL extending along the scanning signal line direction, and a pair of video signal lines (also called "drain signal lines", "image signal lines", "data lines", or "vertical signal lines") DL disposed adjacent to one another and crossing both the scanning signal line and the counter voltage signal line. Each pixel includes a thin-film transistor TFT, a storage capacity (capacitor) Cstg, a pixel electrode PX, and a counter electrode CT. The plurality of the scanning signal lines GL and the plurality of the counter voltage signal lines CL extend from side to side (in a horizontal direction), while being juxtaposed above and below (in a vertical direction) alternately in FIG. 1. A plurality of the video signal lines DL extend above and below (in the vertical direction), while being juxtaposed from side to side (in a horizontal direction) in FIG. 1. The pixel electrode PX is electrically connected to the thin-film transistor TFT, and the counter electrode CT is integrated with the counter voltage signal line CL.

The pixel electrode PX and the counter electrode CT confront one another and control the optical conditions of the liquid crystal layer LC with an electric field generated therebetween, so as to control the displaying operation of the liquid crystal display device of the active matrix type. Both the pixel electrode and the counter electrode have a so-called comb-teeth shape which comprises a plurality of narrow electrodes extending above and below and juxtaposed from side to side in FIG. 1.
<Cross-sectional Structure of a Matrix (a Pixel Portion)>

Figure 2:
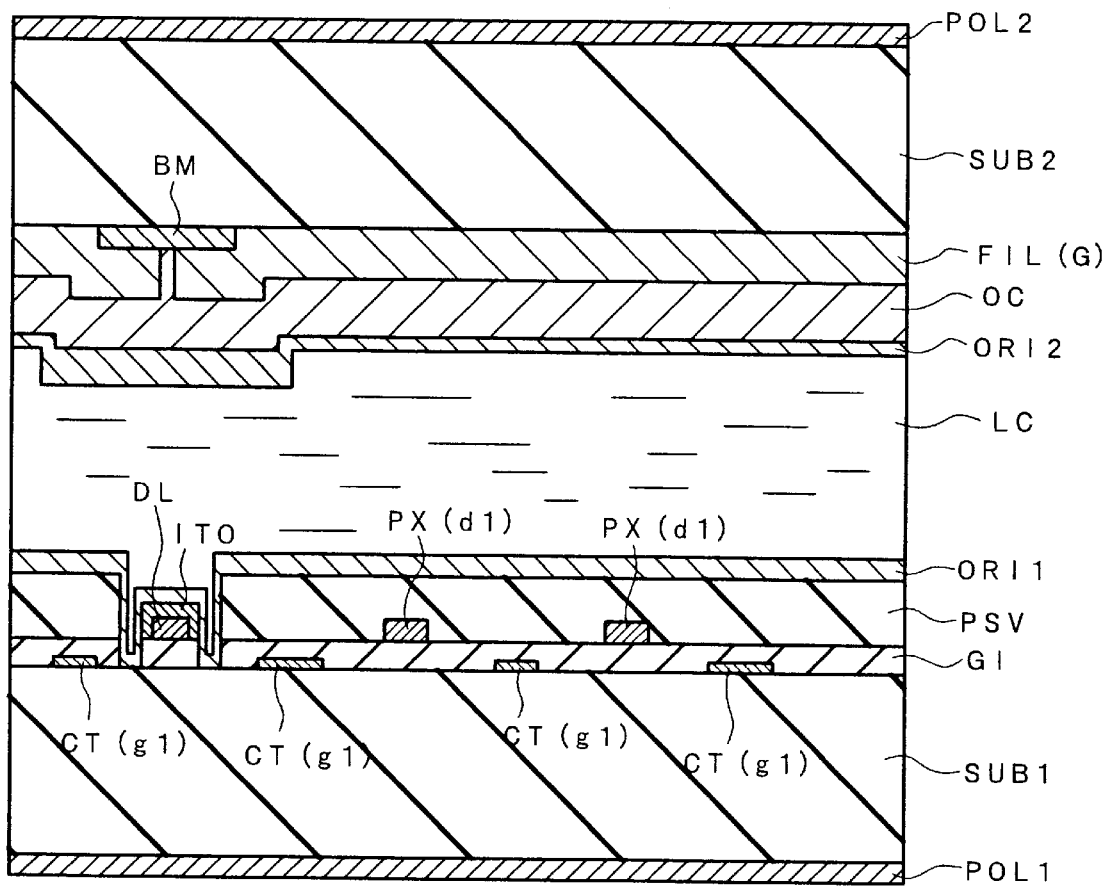
FIG. 2 is a cross section of the pixel region taken along a line 2—2 of FIG. 1.
Figure 3:
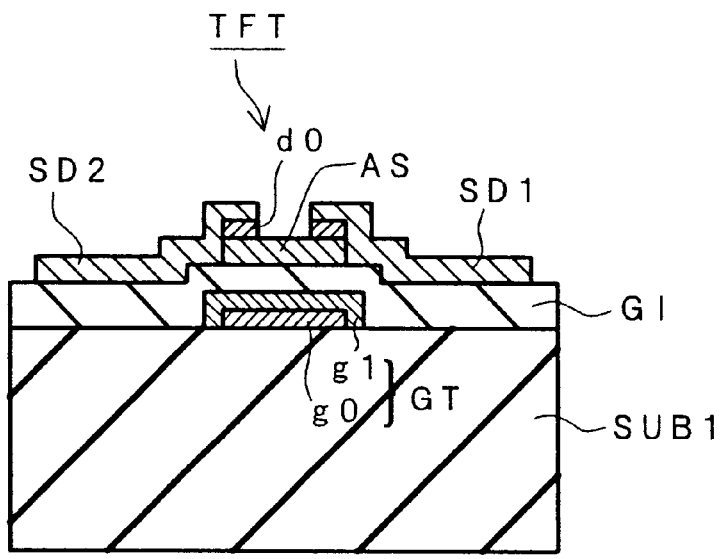
FIG. 3 is a cross section of the thin-film transistor TFT taken along a line 3—3 of FIG. 1.
Figure 4:
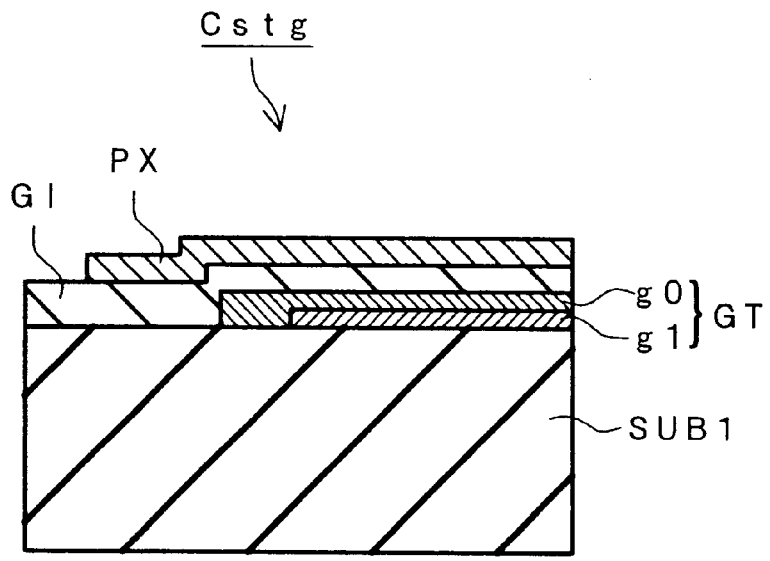
FIG. 4 is a cross section of the storage capacity (capacitor) Cstg taken along a line 4—4 of FIG. 1.

FIG. 2 shows a cross section taken along a line 2—2 of FIG. 1, FIG. 3 shows a cross section of the thin-film transistor TFT taken along a line 3—3 of FIG. 1, and FIG. 4 shows a cross section of the storage capacity (capacitor) Cstg taken along a line 4—4 of FIG. 1. FIGS. 3 and 4 are cross sections limited to laminated structures formed on a liquid crystal display-side surface of the lower transparent glass substrate SUB1. As FIGS. 2–4 show, a lower transparent glass substrate SUB1 arranged below the liquid crystal layer LC has thin-film transistors TFT and the storage capacities Cstg formed thereon, and upper transparent glass substrate SUB2 arranged above the liquid crystal layer LC has color filters FIL and a black matrix pattern BM for shielding light and a layer OC which covers the black matrix pattern BM and the color filter FIL.

On each inner surface (facing the liquid crystal layer LC) of the transparent glass substrates SUB1 and SUB2, an alignment film OR1 or OR2 is formed for regulating initial orientations liquid crystal molecules in the liquid crystal layer LC. On the other hand, a polarizer POL1 or POL2 is formed on each outer surface (at an opposite side to the liquid crystal layer LC) of the transparent glass substrates SUB1 and SUB2, and both the polarizer POL1 and the polarizer POL2 are arranged so that the polarization axes thereof cross at a right angle to one another (i.e. in the cross Nicols or the cross prism arrangement).
<Thin-Film Transistor TFT>

The thin-film transistor operates so as to reduce channel resistance in response to application of a positive bias thereto, and to increase its channel resistance in response to a reduction in the positive bias being applied thereto (towards a zero bias).

As FIG. 3 shows, the thin-film transistor TFT has a gate electrode GT, a gate insulating film GI, an i-type semiconductor layer (i.e. an intrinsic semiconductor layer, to which any impurities determining a conductive type thereof are not doped intentionally) AS of i-type amorphous silicon (Si), and a pair of electrodes including a source electrode SD1 and a drain electrode SD2. The source and drain electrodes are determined intrinsically with respect to a bias direction being applied therebetween, and therefore it should be understood that the relationship between the source and drain electrodes will be inverted during the operation of the thin-film transistor.

However, the expression designating one of the electrode as a source electrode and another thereof as a drain electrode will be fixed in any event in the following description, for convenience of description.

<Gate Electrode GT>

The gate electrode GT is formed continuously together with the scanning signal line GL so that a partial region of the scanning signal line GL is formed as the gate electrode GT. The gate electrode GT is formed as a portion of the scanning signal line GL which exceeds an active region of the thin-film transistor TFT and is broader than the i-type semiconductor layer AS so as to cover the i-type semiconductor layer AS entirely (as seen from a lower side thereof).

Therefore, the gate electrode GT functions not only as the gate electrode of the thin-film transistor TFT, but as a light shielding layer which prevents the i-type semiconductor layer AS from being irradiated by light coming from either outside of the liquid crystal display device or a back light unit of the liquid crystal display device. In this embodiment, the gate electrode GT is formed of a pair of conductive films, one (g1) of which is formed so as to cover another thereof g0. The laminated structure of these conductive films g0 and g1 comprises for example, an Al-layer for g0 and a Cr-layer for g1 each of which is formed by a sputtering process. The gate electrode may be formed of a single layer of e.g. Cr (materials having high conductivity and being less erosive than Al), or one of the above-mentioned laminated conductive films utilized for the scanning signal line GL. In the latter case, one of the laminated conductive films should be extended out therefrom.

<Scanning Signal Line GL>

In this embodiment, the scanning signal line GL is formed of the laminated conductive films g0 and g1 fabricated by the same process as that for the gate electrode GT, and is integrated with the gate electrode GT. The scanning signal line GL may be formed of a single conductive film g1, also. The scanning signal line GL supplies a gate voltage Vg from an external circuit to the gate electrode GT.

<Counter Electrode CT>

The counter electrode CT is formed of a conductive film g1 on the same level on which the gate electrode GT and the scanning signal line GL are formed. The counter electrode CT also may be fabricated so that its portions cross one another. The counter electrode CT has a counter voltage Vcom is applied thereto. In this embodiment, the counter voltage Vcom is set at a lower voltage than the mean direct potential of a driving voltage applied to a video signal line DL between a minimum level $Vd_{min}$ thereof and a maximum level $Vd_{max}$ thereof by a feedthrough voltage of $\Delta Vs$ appearing when the thin-film transistor TFT is turned off. However, an alternating voltage should be applied to the counter electrode CT for reducing the supply voltage to integrated circuits utilized in a video signal driving circuit nearly by half.

In this embodiment, each pixel has three of the counter electrodes CT, two of which are disposed adjacent to a respective one of the video signal lines defining the pixel, while the remaining counter electrode CT is disposed between the other two counter electrodes CT. Each pixel may have more counter electrodes CT than three, and in this case two of them should each be also disposed adjacent to a respective one of the video signal lines, while the rest should be disposed between these two.

According to the layout of the counter electrodes CT in this embodiment, each of the aforementioned two counter electrodes CT prevents an electric field arising from the video signal line DL adjacent thereto from extending to the pixel electrode in the pixel and terminates the electric field thereby. For this purpose, the aforementioned two counter electrodes CT are often formed to be broader in line width than that of the rest of the counter electrodes CT and broader in line width than those of the other electrodes.

However, in this embodiment, each of the counter electrodes CL adjacent to one of the video signal lines DL is formed so as not to be broader in a line width than that of the video signal lines, because improving an opening ratio of each of the pixels takes priority over shielding the pixel electrodes PX from an electric field arising from the video signal lines DL.

The reason why the pixel layout in this embodiment having an arrangement of the counter electrodes as described above can keep the electric field arising from the video signal lines corresponding thereto away from the pixel electrodes will be explained later. There are contrivances for suppressing harmful influences of the electric field from the video signal lines on the pixel electrodes applied to the device structure of this embodiment.

<Counter Voltage Signal Line CL>

The counter voltage signal line CL comprises a laminated structure of conductive films g0 and g1 in this embodiment. The laminated structure is fabricated by the same process as that for the laminated structure of the gate electrode GT and the scanning signal line GL. The conductive film g1 of the counter voltage signal line CL is fabricated by the same process as that for the counter electrode CT (g1) and is integrated therewith. The counter voltage signal line CL may be formed of a single conductive film g1, also. The counter electrode CT also may be formed of a single conductive film g1 similar to the gate electrode GT and the scanning signal line GL.

The counter voltage signal line CL supplies the counter voltage Vcom from an external circuit to the counter electrode CT.

<Insulating film GI>

The insulating film GI is utilized as a gate insulating film of the thin-film transistor TFT through which an electric field is applied to the semiconductor layer AS together by the gate electrode GT. The insulating film GI is formed on the gate electrode GT and the scanning signal line GL. In this embodiment, a silicon nitride ($SiN_x$) film formed by a plasma CVD (Chemical Vapor Deposition) process is selected for materials of the insulating layer GI, and the silicon nitride film is formed to be 1200–2700 Angstrom (Å)(2400 Å for this embodiment). The insulating film GI is formed so as to enclose a matrix region wholly, and the periphery thereof is removed so as to expose terminals GTM and DTM to be connected to external circuits. The insulating film also contributes to isolation of the scanning signal line GL and the counter voltage signal line CL electrically from the video signal line DL.

<i-type Semiconductor Layer AS>

The i-type semiconductor layer AS is formed of amorphous silicon and is 200–2200 Å (c.a. 2000 Å, for this embodiment) in thickness. The layer d0 is a semiconductor layer of $N^+$-type amorphous silicon doped by phosphorus (P) for forming an ohmic contact with the conductive layer SD1 and SD2. The layer d0 remains in a region where the i-type semiconductor (lying thereunder) and one of the conductive layer SD1 and SD2 (lying thereon) overlap one another.

The i-type semiconductor layer is also formed in a region where the scanning signal line GL and one of the counter voltage signal line and the video signal line cross one another, and is interleaved therebetween. The region will be designated as a "crossover area" hereinafter. The i-type semiconductor layer formed in such a crossover area may be separated from each other and from that being formed below (or over) one of the conductive layers SD1 and SD2. The i-type semiconductor layer being formed in the crossover area prevents the scanning signal line from being short-circuited with the counter voltage signal line and the video signal line.

<Source Electrode SD1, Drain Electrode SD2>

Each of the source electrode SD1 and the drain electrode SD2 comprises a conductive film d1 in contact with the $N^+$-type semiconductor layer d0 (of an amorphous Silicon).

A chromium film formed by a sputtering process is utilized for the conductive film d1, and the conductive film d1 is formed up to 1500–3000 Å (c.a. 3000 Å, for this embodiment) in thickness. As more stress will be put on a chromium film by increasing a thickness thereof, the thickness of the chromium film should remain at 4000 Å or thinner than 4000 Å. By utilizing a Chromium film for the conductive film d1, sufficient adhesive strength can be obtained at a junction between the conductive film d1 and the $N^+$-type semiconductor layer d0. The conductive film d1 may be formed of materials other than chromium, such as materials in a group which consists of refractory metals (Mo, Ti, Ta, W) and silicides (disilicides) thereof ($MoSi_2$, $TiSi_2$, $TaSi_2$, $WSi_2$).

The laminated structure formed of the i-type semiconductor layer AS, the $N^+$-type semiconductor layer d0, and the conductive film d1 stacked in this order is fabricated by patterning the conductive film d1 using a mask pattern (by i.e. an optical lithography process), then removing the $N^+$-type semiconductor layer d0 partially in accordance with the pattern of the conductive film d1. Therefore, the $N^+$-type semiconductor layer d0 remaining on the i-type semiconductor layer AS other than a part thereof lying under the conductive film d1 is removed in a self-alignment manner (i.e. in accordance with another pattern of the conductive film d1 belonging to the stacked structure itself). While $N^+$-type semiconductor layer d0 is etched away throughout the thickness thereof, the i-type semiconductor layer AS also will be etched around an upper surface thereof. However, the amount of the i-type semiconductor layer AS which is etched can be reduced by controlling the etching time (period).

<Video Signal Line DL>

The video signal line DL is formed of an $N^+$-type semiconductor layer d0 and conductive films g1 being stacked in this order on the same level on which the source electrode SD1 and the drain electrode SD2 are formed. The video signal line DL is integrated with the drain electrode SD2.

Both portions of the insulating film and the protective film formed around the video signal line DL are etched away together in accordance with a mask pattern in order to make a hollow portion around the video signal line DL. The hollow will be filled with the liquid crystal composition substance with which the video signal line DL is covered.

The hollows are formed around the portions of the video signal line DL other than the crossover areas and the vicinities thereof where the video signal line DL crosses over the scanning signal line or the counter voltage signal line. In other words, the portions of the insulating film GI and the protective film PSV covering the video signal line DL near regions which function as pixels actually are removed by an etching process.

The video signal line DL is formed of a conductive film d1 and a transparent conductive film ITO covering the conductive film d1. The transparent conductive film ITO is formed of Indium-Tin-Oxide and is fabricated to be broader in line width than that of the conductive film d1. Therefore, the conductive film d1 and the liquid crystal layer LC (a layer of the liquid crystal composition substance) are so isolated chemically as to prevent any undesirable chemical reactions from being accelerated therebetween.

An electrical field in accordance with a voltage difference between the video signal line DL and the counter electrode CT is generated therebetween. If the electric field leaks into the pixel electrode PX, crosstalk appears in a pixel corresponding to the pixel electrode PX. By filling a space between the video signal line DL and the counter electrode CT with a substance having a high permittivity (dielectric constant), such a leakage of the electric field from the video signal line DL is prevented. The structure in this embodiment calls for filling not only a space between the transparent substrate SUB1 and the other transparent substrate opposite thereto, but also another space between the video signal line DL and the counter electrode CT, with the liquid crystal composition substances (e.g. liquid crystal molecules) so as to prevent the aforementioned crosstalk problem. In other words, the present invention disposes at least one insulating region in addition to at least one conventional insulating region as the insulating film GI, the protective film PSV, or the like being utilized for isolating the video signal line DL and the counter electrode CT adjacent thereto. The at least one additional insulating region should have a higher permittivity than that of the at least one conventional insulating region, preferably. In accordance with the present invention, at least two kinds of insulating materials or dielectric materials are disposed along the surface on which the video signal line DL and the counter electrode CT are disposed, as FIG. 2 shows. Preferably, the at least two kinds of insulating materials or dielectric materials have different permittivities from each other and are formed on the same level as each other.

While silicon nitride films being utilized for the protective film PSV and the insulating film GI have a permittivity of 6.7, the liquid crystal composition substance has a permittivity of 13 so that the shielding effect for the leakage of the electric field arising from the video signal line DL is apparently enhanced so as to be larger than that of the conventional structure isolating the video signal line DL and the counter electrode CT by the protective film PSV and the insulating film GI of silicon nitride.

In this embodiment, a portion of the insulating film GI lying between the video signal line DL and the transparent substrate SUB1 is not etched away, but is fabricated in accordance with the pattern of the video signal line. The portion of the insulating film GI has substantially the same pattern as that of the video signal line DL of the conductive film d1 and the transparent conductive film ITO with respect to the surface of the transparent substrate SUB1. According to this structure, the portion of the insulating film GI prevents the video signal line DL from being disconnected due to flaws on the surface of the transparent glass substrate SUB1, and prevents a short circuit between the counter electrode CT and the video signal line DL by an overlapping thereof in accordance with an erroneous fabrication due to a pattern being formed during an optical lithography process for the conductive film g1 of the counter electrode. The optical lithography process will be explained later.

<Pixel Electrode PX>

The pixel electrode is formed of the same laminated structure of a $N^+$-type semiconductor layer d0 and conductive films g1 as that of the source electrode SD1 and the drain electrode SD2. In this embodiment, the pixel electrode is integrated with the source electrode SD1.

<Storage Capacity Cstg>

The pixel electrode is formed so as to overlap with the counter voltage signal line CL at an opposite end thereof to the end at which the thin-film transistor TFT is connected thereto. This overlapping of the pixel electrode PX and the counter voltage signal line CL provides the storage capacity (an electrostatic capacitor) Cstg, using former as one electrode PL2 and the latter as another electrode PL1, which confronts the one electrode PL2. A dielectric film of the storage capacity for spacing these electrodes PL1 and PL2 is formed of the insulating film GI, which is utilized for the gate insulating film of the thin-film transistor TFT.

In the plan view of FIG. 1, the storage capacity Cstg is formed at a region where the conductive film g1 of the counter voltage signal line CL is widened. In this embodiment, the electrode PL1 of the storage capacity Cstg lying one the lower side of the insulating layer GI of the storage capacity is formed of a refractory metal, such as Cr, so that the storage capacity Cstg is hardly affected by point defects. The point defects are caused by a short circuit between the electrodes PL1, PL2 according to materials of the electrode PL1. More specifically, when forming the electrode PL1 out of aluminum, whiskers of Al appearing around the electrode PL1 penetrate the insulating layer GI formed thereon, reach the electrode PL2, and cause the aforementioned short circuit. Such a short circuit caused by the whiskers is also suppressed by the laminated structure of the counter voltage signal lines, which comprises the conductive film g0 of Al and the conductive film g1 of such refractory metals as Cr covering the upper and lateral surfaces of the conductive film g0.

<Protective Film PSV>

The protective film PSV is formed over the thin-film transistor TFT. The protective film is also called "a passivation film". The protective film PSV is formed mainly for protecting the thin-film transistor TFT from moisture and is formed of material having a high transparency and forming a good vapor barrier. For instance, the protective film PSV is formed of silicon oxide or silicon nitride, which are grown by a plasma CVD (Chemical Vapor Deposition) method, having a thickness around 1 μm.

The protective film PSV is removed at the opening thereof so as to expose an upper surface of the connecting electrode in a matrix area (an image-displaying area) of the liquid crystal display panel, where a plurality of the pixels are arranged two-dimensionally. The protective film PSV is also removed so as to expose terminal areas for connections to respective external circuits GTM and DTM (hereinafter, externally connecting terminals) in the periphery of the liquid crystal display panel.

<External Connecting Terminals GTM, DTM>

Figure 5A:
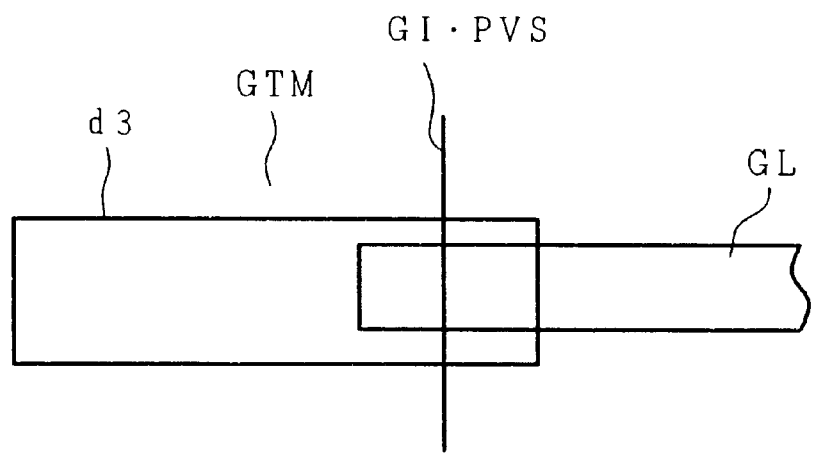
FIGS. 5A and 5B are a process flow diagram which connecting terminals of the liquid crystal display device according to the present invention.

FIG. 5A shows a plan view of the external connecting terminal (called, "a gate terminal") GTM. The external connecting terminal GTM is fabricated by steps of forming the scanning signal line GL, then covering the scanning signal line GL other than an end area thereof with the insulating film GI and the protective film PSV in this order, and finally connecting the conductive film d3 of ITO to the scanning signal line GL at the end area (in a left half of FIG. 5A). The conductive film d3 has a first portion formed on an upper surface of the protective film PSV and a second portion formed on an upper surface of the scanning signal line GL exposed at the end area thereof, and is extended continuously from the first portion to the second portion.

Figure 5B:
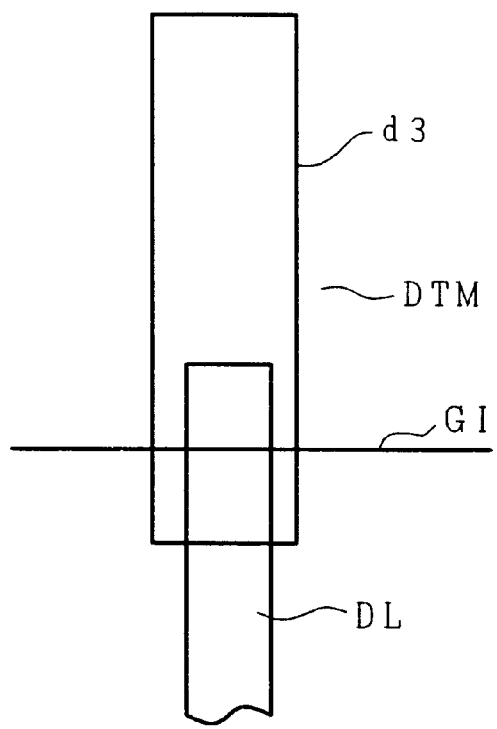

FIG. 5B shows a plan view of the external connecting terminal (called "a drain terminal") DTM. The external connecting terminal DTM is fabricated by steps of forming the video signal line GL on the insulating film GI, then covering the video signal line DL other than an end area thereof with the protective film PSV, and finally connecting the conductive film d3 of ITO to the video signal line DL at the end area (in an upper half of FIG. 5B). The conductive film d3 has a first portion formed on the upper surface of the protective film PSV and a second portion formed on an upper surface of the video signal line DL exposed at the end area thereof, and is extended continuously from the first portion to the second portion.

The conductive film d3 prevents each of the electric contacts of the external connecting terminals DTM, GTM from being damaged by corrosion, etc.

In this embodiment, the Indium-Tin-Oxide film for forming the conductive film d3 is also formed so as to cover the video signal lines DL in the same process.

<Fabrication Processes>

Fabrication processes for the above-mentioned structures on the substrate SUB1 of the liquid crystal display device will be explained hereinafter with reference to FIGS. 6A–6G. In the respective figures, a letter in parenthesis indicated at the center portion thereof represents an abbreviation of a name of each process. In each figure, the left half thereof shows a cross section of the thin-film transistor TFT taken along the line 4—4 in FIG. 1 and the right half thereof shows a cross section of the crossing portion of the scanning signal line GL (the gate electrode GT in the pixel) and the video signal line DL taken along the line 3—3 in FIG. 1. The processes A–G other than the process C are classified with respect to optical lithographic processes (photolithography treatments) and each cross sectional drawing of the processes illustrates an image after a sequence of the optical lithographic process, a fabrication of the device structure(s), and a removal of photoresist, in this order.

The optical lithographic process in this description is defined as a sequence of steps including coating a photoresist on a substrate (to be fabricated) e.g. by spinning the substrate (i.e. a spin-coating method), baking the photoresist applied on the substrate (i.e. a prebaking processing), exposing the photoresist to light passing through a mask (a photomask), baking the photoresist (i.e. a postbaking processing), developing the photoresist, removing parts of the photoresist using a release agent (patterning the photoresist according to an opening pattern of the mask), and cleaning the surface of the substrate to be fabricated. A repetition of such explanations will be omitted. Further explanations will be presented according to the processes classified as follows.

Figure 6A:
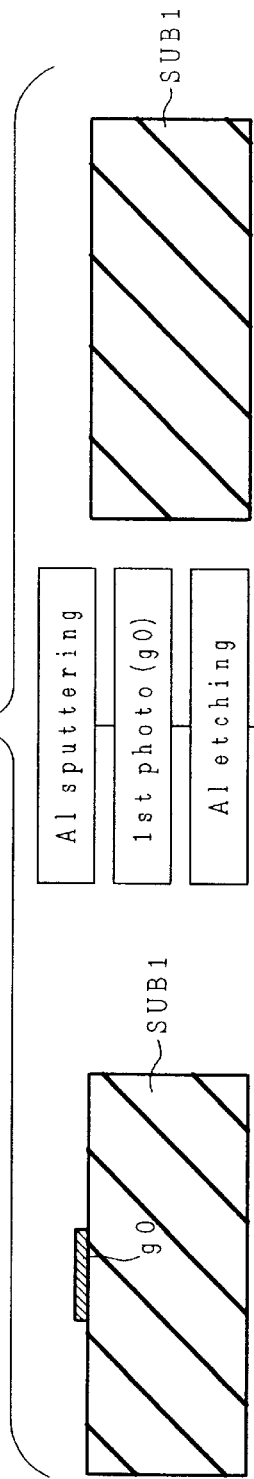
FIGS. 6A–6G are a process flow diagram which shows cross sectional images related to the fabrication process of the liquid crystal display device according to the present invention, sequentially in steps.

<<Process (A)—FIG. 6A>>

A conductive film g0 which is 1000 Å in thickness is formed on a lower transparent glass substrate SUB1 of type AN635 glass (Asahi Glass Co. Ltd.). A material such as Al—Pd, Al—Si, Al—Ta, Al—Ti—Ta, etc. formed by a sputtering process is utilized for the conductive film g0. After a first optical lithographic processing (1st photo process), the conductive film g0 is selectively etched by mixed solvent of phosphoric acid ($H_3PO_4$), nitric acid ($HNO_3$), and glacial acetic acid ($CH_3COOH$) in accordance with a photoresist pattern formed thereon during the first optical lithographic processing, and the conductive film g0 is fabricated into scanning signal lines GL and counter voltage signal lines CL.

Figure 6B:
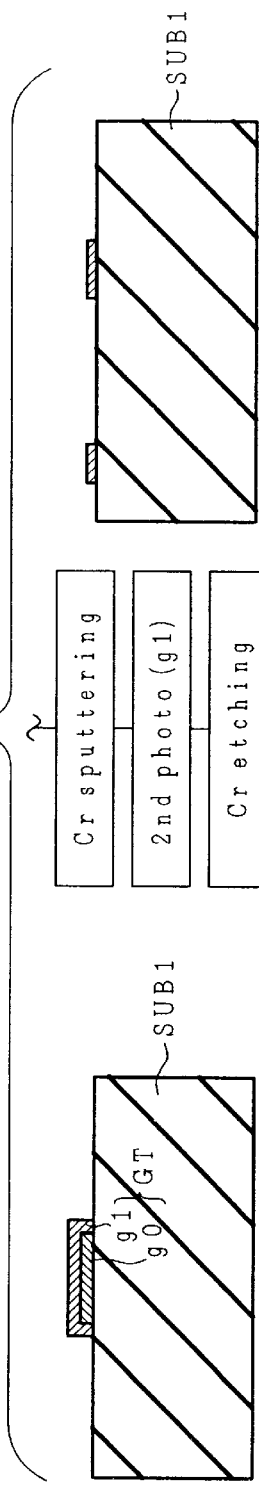

<<Process (B)—FIG. 6B>>

A conductice film g1 of chromium (Cr) of 2000 Å in thickness is formed by a sputtering method. After a second optical lithographic processing (2nd photo process), the conductive film g1 is fabricated into the scanning signal lines GL, the counter voltage signal lines CL, and counter electrodes CT by a selective etching in accordance with a photoresist pattern which is formed on the conductive film g1 during the second optical lithographic processing. While a chromium film is utilized for the conductive film g1 in this embodiment, other refractory materials (Mo, Ti, Ta, W, etc.) or alloys thereof may be utilized for the conductive film g1 also.

Figure 6C:
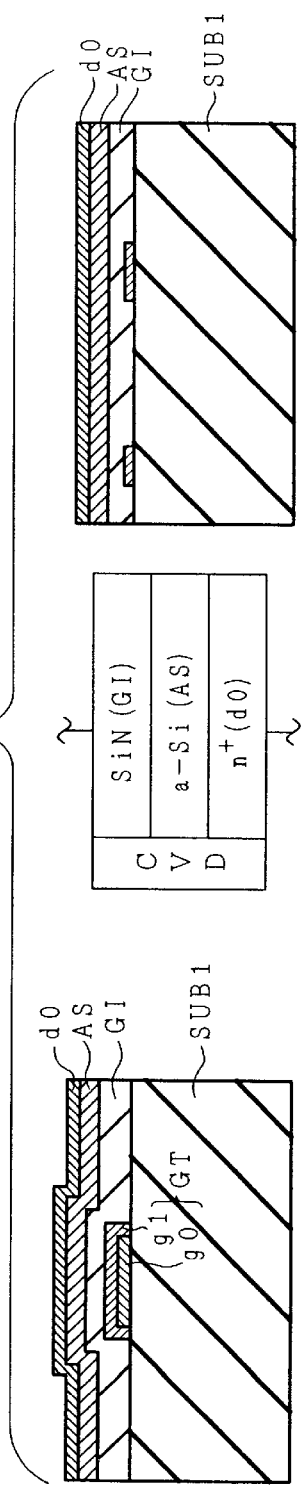

<<Process (C)—FIG. 6C>>

By introducing ammonia gas ($NH_3$), silane gas (silicon hydride $Si_nH_{2n+2}$) and nitrogen gas ($N_2$) into a plasma CVD apparatus (a chamber for plasma chemical vapor deposition) in which the lower transparent glass substrate SUB1 after the process (B) is contained, a silicon nitride film of 2000 Å is formed on an upper surface of the lower transparent glass substrate SUB1. Then, an i-type amorphous silicon layer (a-Si layer) is formed by introducing silane gas ($Si_nH_{2n+2}$) and hydrogen gas ($H_2$) into the plasma CVD apparatus, and finally a $N^+$-type amorphous silicon layer is formed by introducing hydrogen gas ($H_2$) and phosphine (hydrogen phosphide $PH_3$) into the plasma CVD apparatus.

Figure 6D:
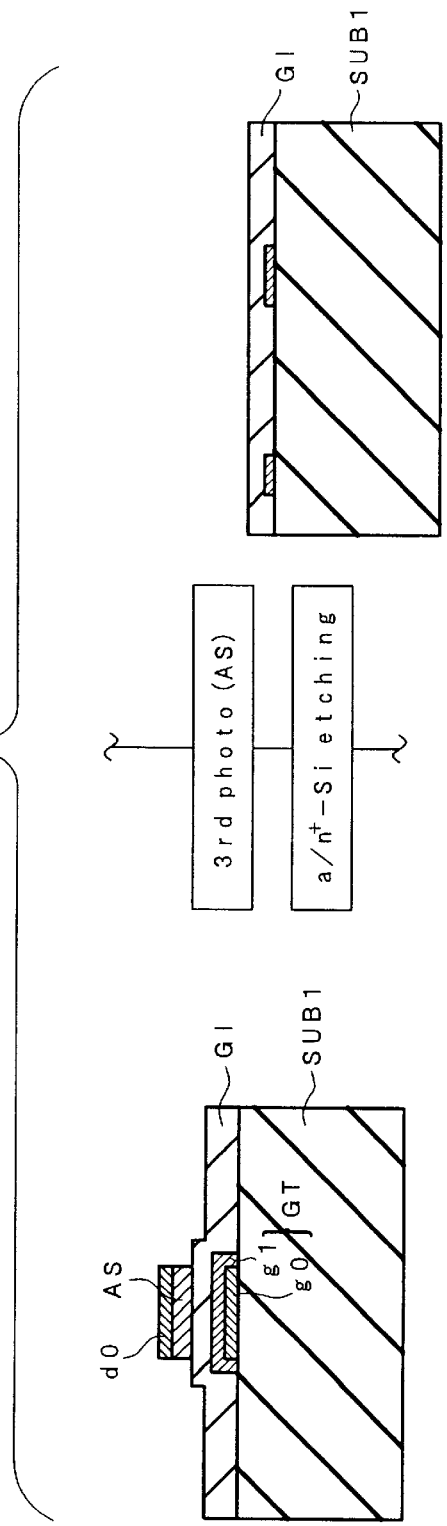

<<Process (D)—FIG. 6D>>

After a third optical lithographic processing (3rd photo process), the $N^+$-type amorphous silicon layer and the i-type amorphous silicon layer is etched by a dry process using sulfur hexafluoride ($SF_6$) and carbon tetrachloride (tetrachloromethane $CCl_4$) etching gas. The amorphous silicon layers AS and d0 are etched in accordance with a photoresist pattern which is formed on the $N^+$-type amorphous silicon layer during the third optical lithographic processing, and consequently islands of i-type semiconductor layers AS are formed.

Figure 6E:
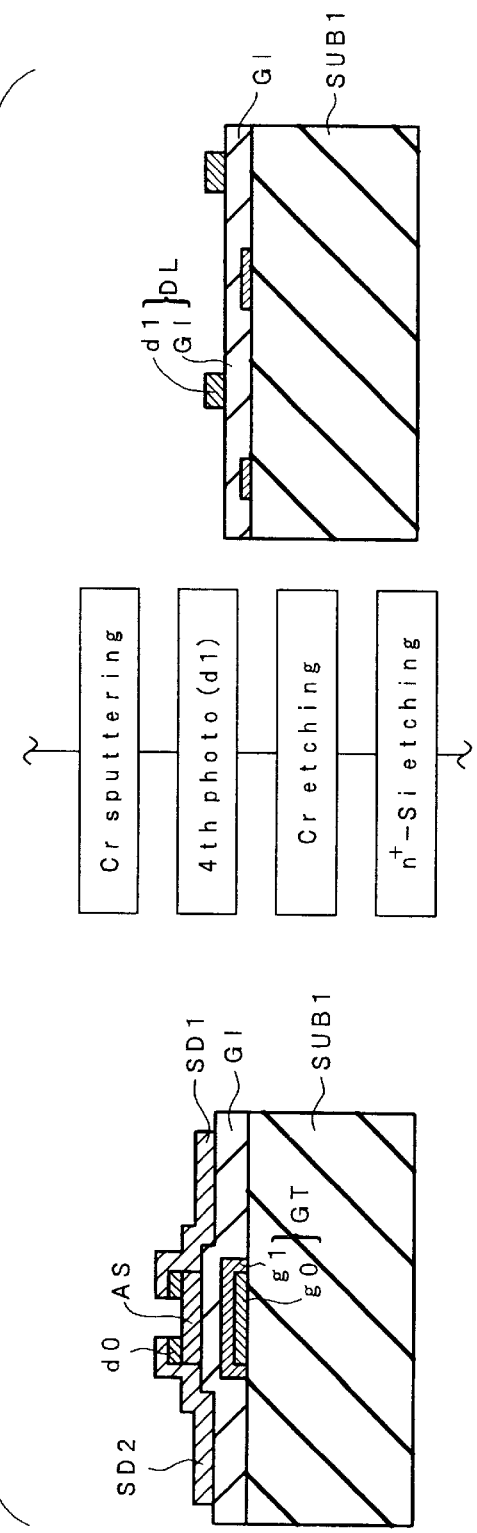

<<Process (E)—FIG. 6E>>

A conductive film d1 of Cr which is 3000 Å in thickness is formed by a sputtering method. After a fourth optical lithographic processing (4th photo process), the conductive film d1 is etched in a similar manner (wet process) to that for the process B, and is fabricated into video signal lines DL, source electrodes SD1, drain electrodes SD2, and pixel electrodes PX. Then, etching the $N^+$-type amorphous silicon layer by introducing sulfur hexafluoride ($SF_6$) and carbon tetrachloride ($CCl_4$) into a etching apparatus in which the lower transparent glass substrate SUB1 is contained, the $N^+$-type semiconductor layer d0 lying between the source electrode SD1 and the drain electrode SD2 in every pixel is removed selectively according to a photoresist pattern which is formed on the conductive film d1 during the fourth optical lithographic processing.

Figure 6F:
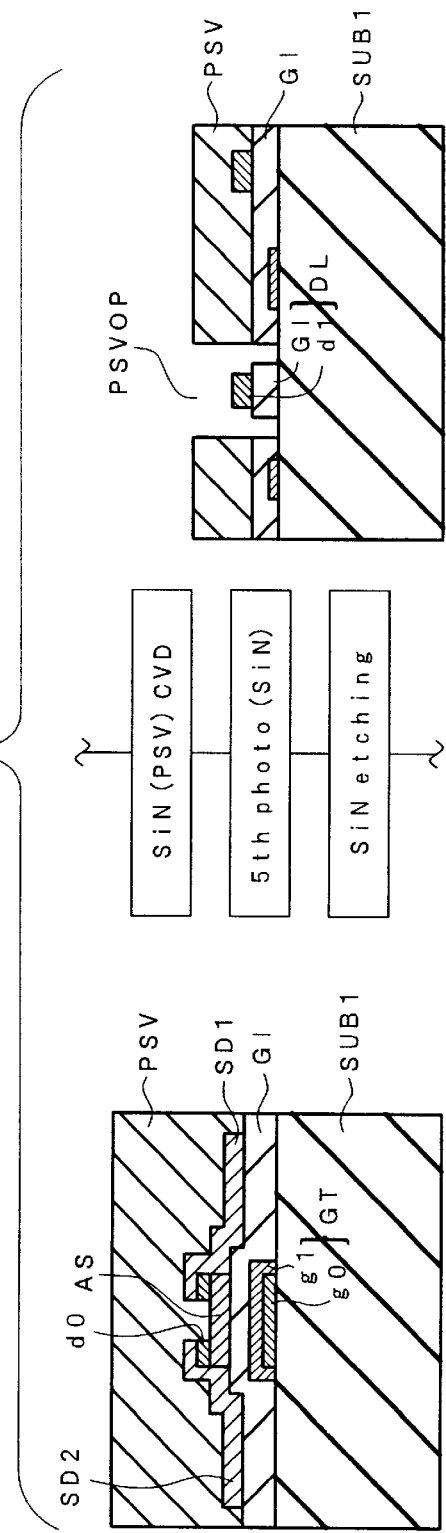

<<Process (F)—FIG. 6F>>

By introducing ammonia gas ($NH_3$), silane gas ($Si_nH_{2n+2}$), and nitrogen gas ($N_2$) into a plasma CVD apparatus in which the lower transparent glass substrate SUB1 after the process (E) is contained, a silicon nitride film of 1 μm for the protective film PSV is formed. After a fifth optical lithographic processing (5th photo process), the silicon nitride film d1 is etched by a photolithography technique using sulfur hexafluoride ($SF_6$) for dry etching gas selectively in accordance with a photoresist pattern which is formed on the silicon nitride film during the fifth optical lithographic processing, and is fabricated into a protective film PSV1 having openings PSVOP.

Figure 6G:
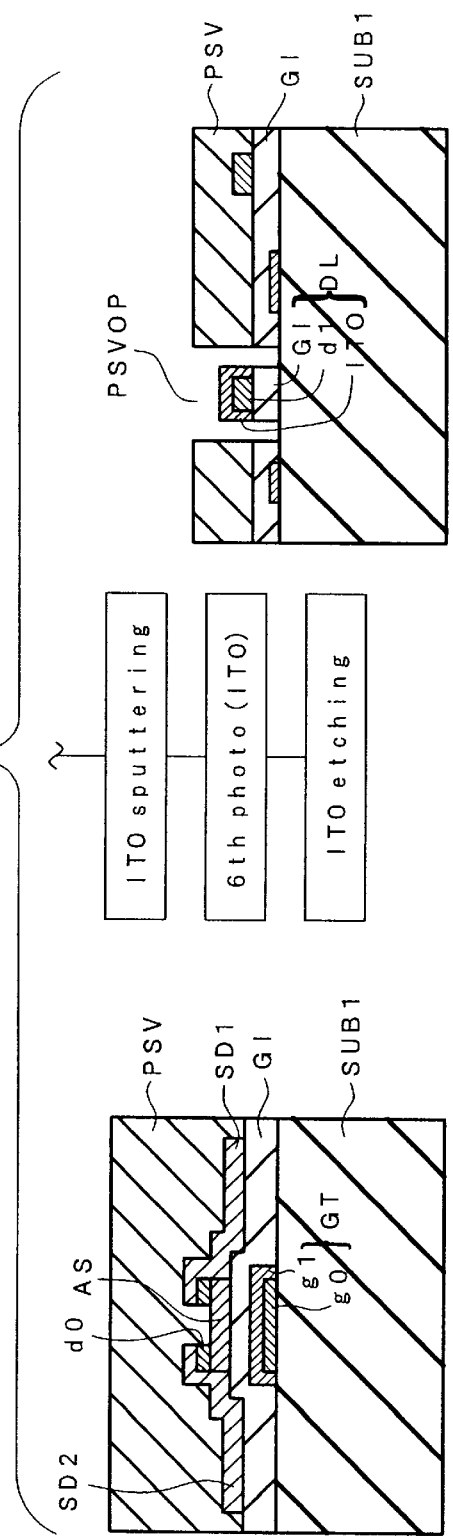

<<Process (G)—FIG. 6G>>

A transparent conductive film of ITO (Indium-Tin-Oxide) which is 1400 Å in thickness is formed on an upper surface of the lower transparent glass substrate SUB1 after the process (F) by a sputtering method. After a sixth optical lithographic processing (6th photo process), the transparent conductive film is etched using a mixed solvent of hydrochloric acid (HCl) and nitric acid ($HNO_3$) selectively in accordance with a photoresist pattern which is formed on the transparent conductive film during the sixth optical lithographic processing, and is fabricated into the conductive film ITO of the video signal lines DL in the matrix area of the liquid crystal display panel, the gate terminals GTM and the drain terminals DTM in the periphery of the liquid crystal display panel. All fabrications on the substrate SUB1 of the liquid crystal display device according to the present invention are completed by the process (G).

Embodiment 2

Another embodiment of the liquid crystal display device according to the present invention will be explained hereinafter with reference to FIG. 7.

Figure 7:
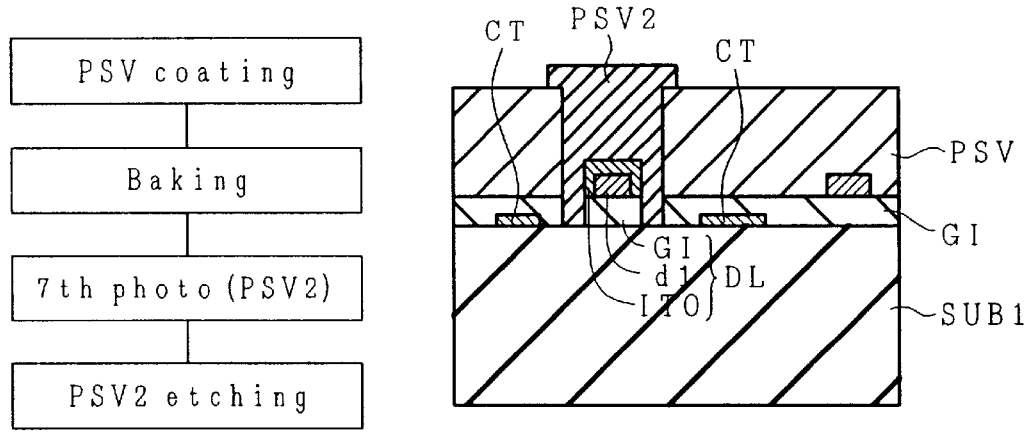
FIG. 7 is a cross section of the pixel region according to another embodiment (embodiment 2) taken along a line 2—2 of FIG. 1.

In FIG. 7, the protective film PSV is not formed at a region around the video signal line DL being formed on the insulating film GI, and the region is filled with other material, for instance, polyvinylidene fluoride.

The liquid crystal display device in this embodiment is manufactured by adding following process to the processes for the substrate SUB1 previously mentioned in the embodiment 1.

<<Process (H)—FIG. 7>>

Polyvinylidene fluoride resin which is 10000 Å in thickness is formed on an upper surface of the substrate SUB1 after the process (G) by the spin-coating method. Then, the polyvinylidene fluoride resin is hardened during a curing process by heating the substrate SUB1, and an optical lithographic process is applied to the polyvinylidene fluoride resin. Finally, the polyvinylidene fluoride resin is removed partially in accordance with a pattern of photoresist formed during the optical lithographic process, so that the opening PSVOP of the insulating film GI and the protective film PSV formed around the video signal line DL in the matrix area is filled with the polyvinylidene fluoride resin PSV2.

Polyvinylidene fluoride resin has a permittivity of 12, and therefore is effective in prevention of crosstalk as mentioned in the embodiment 1.

Furthermore, compared with the embodiment 1, the liquid crystal display device of this embodiment has an additional effect as follows. As the permittivity of the liquid crystal composition substance being utilized for filling up a space between the video signal line DL and the counter electrode CT varies in response to an effective voltage appearing between the video signal line DL and the counter electrode CT, the wiring capacitance for each of the video signal line DL is varied by an image to be displayed by a pixel corresponding thereto. Therefore, an external driving circuit having a large driving capacity sufficient to adapt to such variation in the wiring capacitance needs to be provided in the liquid crystal display device.

In this embodiment, polyvinylidene fluoride resin has an inherent permittivity thereto regardless of the effective voltage applied thereto, and therefore sufficiently fine image can be displayed even by an external driving circuit having a small driving capacity.

In this embodiment, the polyvinylidene fluoride resin is utilized for filling the opening PSVOP of the insulating film GI and the protective film PSV formed around the video signal line DL. However, it is apparent from the foregoing explanations for the embodiments 1 and 2 that a material other than polyvinylidene fluoride resin may be utilized also, if the material has a permittivity higher than 6.7.

Furthermore, the polyvinylidene fluoride resin PSV2 should be fabricated so as to cover a gap (space) between the video signal line DL and the counter electrode CT adjacent thereto at a region where the polyvinylidene fluoride resin is overlapped with the protective film PSV.

In this structure, for instance, if the back light unit (a light source of the liquid crystal display device) is installed at a side of the transparent substrate SUB1, the polyvinylidene fluoride resin PSV2 prevents light from a back light unit from leaking out through the gap between the video signal line DL and the counter electrode CT.

Embodiment 3

Figure 8:
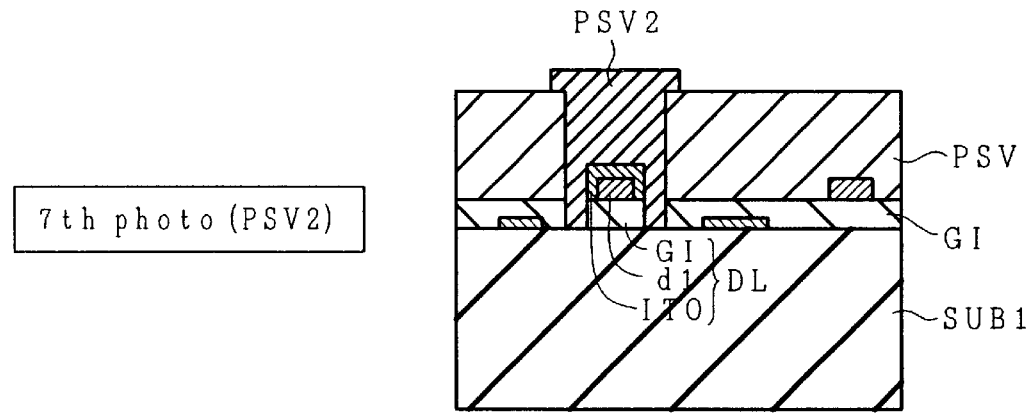
FIG. 8 shows a cross section of the pixel according to another embodiment (embodiment 3) taken along a line 2—2 of FIG. 1.

Another embodiment of the liquid crystal display device according to the present invention will be explained hereinafter with reference to FIG. 8. In this embodiment, a resist material with which black pigments are mingled is utilized for materials PSV2 filling the opening PSVOP of the insulating film GI and the protective film PSV formed around the video signal line DL.

A first difference between this embodiment and the foregoing two embodiments resides in utilizing a resist material having a photosensitive property (e.g. a photoresist) for filling the opening. Therefore, the resist material can be fabricated at the developing step of the optical lithographic process so that the etching step required in the embodiment 2 can be omitted in this embodiment. A second difference between this embodiment and the foregoing two embodiments resides in utilizing a material having a low transmissivity (optical transmittance) as the black pigments for filling the opening, so that a light shielding region around the video signal line DL can be disposed on the substrate SUB1. Therefore, undesirable light for displaying an image can be shielded thereby, as well as by the black matrix formed on the substrate SUB2 opposite to the substrate SUB1, and the contrast ratio of the image is improved furthermore.

A similar effect will be obtained by other materials for example, by mingling palladium (Pd) and nickel (Ni) treated with an electroless plating with a resist material.

It goes without saying that each of the materials PSV2 for filling the opening PSVOP in this embodiment had better be fabricated so as to cover a gap between the video signal line DL and the counter electrode CT adjacent thereto at a region where the each of the materials PSV2 is overlapped with the protective film PSV.

While the video signal line DL described in each of the foregoing embodiments has an Indium-Tin-Oxide film on a surface thereof, it goes without saying that the Indium-Tin-Oxide film is not always necessary. As mentioned above, the Indium-Tin-Oxide film is formed in order to prevent the liquid crystal layer from contacting the conductive film d1 of the video signal line DL. If any structures which can substitute for the Indium-Tin-Oxide film, from the point of view of the function described above, are employed in a liquid crystal display device (for instance, materials PSV2 in the embodiments 2 and 3), the Indium-Tin-Oxide film ITO of the video signal line DL may be omitted.

In the foregoing embodiments, not only the protective film PSV but also the insulating film GI are etched and removed in the vicinity of the video signal line DL, and the cavity PSVOP appearing with the etching thereof is filled with the liquid crystal LC or the insulating materials PSV2.

However, it goes without saying that the present invention is able to be embodied by etching and removing the protective film PSV only (without any fabrication on the insulating film GI)in a vicinity of the video signal line DL, and by filling a cavity in accordance with the protective film PSV etched away with the liquid crystal or the insulating materials.

As apparent from the foregoing explanation, the present invention provides preferable structures of liquid crystal display devices to generate an electric field between the pixel electrode and the counter electrode effectively, despite the provision of a simple structure.

The present invention also improves the contrast ratio of an image displayed by the liquid crystal display devices.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
   a pair of substrates having a liquid crystal layer interposed therebetween;
   a plurality of video signal lines and scanning signal lines formed on one of said pair of substrates and crossing each other in a matrix to form respective pixel regions;
   at least a counter electrode formed on the one of said pair of substrates in each pixel;
   a first insulation layer formed over said counter electrode;
   at least a pixel electrode formed on said first insulation layer;
   a passivation layer formed over the pixel electrode; and
   an orientation layer formed over said passivation layer;
   wherein two counter electrodes of adjacent pixels are spaced from one another by an insulating region of said first insulating layer and an insulating region of a second insulating layer; and
   wherein one of said plurality of video signal lines is disposed between said two counter electrodes and completely isolated from said two counter electrodes by at least a portion of said second insulating layer and a portion of said orientation layer.

2. A liquid crystal display device according to claim 1, wherein said second insulating layer is said liquid crystal layer.

3. A liquid crystal display device according to claim 1, wherein a permittivity of said second insulating layer is higher than a permittivity of said first insulating layer.

4. A liquid crystal display device according to claim 3, wherein said second insulating layer is said liquid crystal layer.

5. A liquid crystal display device according to claim 1, wherein said one of said plurality of video signal lines which is disposed between said two counter electrodes includes a first conductive layer and a second conductive layer, and said first conductive layer of the one of said plurality of video signal lines is formed on at least a portion of said first insulating layer.

6. A liquid crystal display device according to claim 5, wherein said second conductive layer of the one of said plurality of video signal lines is made of ITO.

7. A liquid crystal display device according to claim 5, wherein said second insulating layer is said liquid crystal layer.

8. A liquid crystal display device comprising:
   a pair of substrates having a liquid crystal layer interposed therebetween;
   a plurality of video signal lines and scanning signal lines formed on one of said pair of substrates and crossing each other in a matrix so as to form respective pixel regions;

at least a counter electrode formed on the one of said pair of substrates;

an insulation layer formed over said counter electrode;

at least a pixel electrode formed on said insulating layer;

a passivation layer formed over said pixel electrode;

an orientation layer formed over said passivation layer; and another insulating layer formed over said plurality of video signal lines and a plurality of said pixel electrodes and counter electrodes;

wherein said another insulating layer is provided with a hollow portion at least partially around and completely isolating one of said plurality of video signal lines in each pixel; and wherein two counter electrodes are formed in respective pixels on each side of said one of said plurality of video signal lines.

9. A liquid crystal display device according to claim 8, wherein another insulating layer is formed in said hollow portion.

10. A liquid crystal display device according to claim 8, wherein said another insulating layer is said liquid crystal layer.

11. A liquid crystal display device according to claim 8, wherein a permittivity of said another insulating layer is over 6.7.

12. A liquid crystal display device comprising:

a pair of substrates having a liquid crystal layer interposed therebetween;

a plurality of video signal lines and scanning signal lines formed on one of said pair of substrates and crossing each other in a matrix so as to form respective pixel regions;

at least a counter electrode formed on the one of said pair of substrates in each pixel;

an insulation layer formed over said counter electrode;

at least a pixel electrode formed on said insulation layer; and wherein an another insulating layer is provided at two regions, a first region of said two regions being between one of said plurality of video signal lines and the other of said pair of substrates, and a second region of said two regions being between two of said counter electrodes which are provided in adjacent pixels; and wherein said another insulating layer is provided with a hollow portion at least partially around said one of said plurality of video signal lines in each pixel and completely isolate said one of said plurality of video signal lines from two adjacent counter electrodes on both sides of said one of said plurality video signal lines.

13. A liquid crystal display device according to claim 12, wherein said same insulating material is liquid crystal material.

14. A liquid crystal display device comprising:

a first substrate and a second substrate having a liquid crystal layer interposed therebetween;

a plurality of video signal lines and scanning signal lines formed on said first substrate and crossing each other in a matrix so as to form respective pixel regions; and at least a pixel electrode being formed on said first substrate in each pixel;

wherein said first substrate has a thick region and a thin region, and said second substrate has a thick region and a thin region, said thin region of said first substrate and thick region of said second substrate being disposed in an overlapping relation; and wherein an insulating material is provided with a hollow portion at the thin region of said first substrate at least partially around said one of said plurality of video signal lines in each pixel from two adjacent counter electrodes formed on both sides of said one of plurality of video signal lines.

* * * * *